United States Patent [19]

Merkl

[11] 4,093,702
[45] * June 6, 1978

[54] METHOD OF REMOVING GASEOUS POLLUTANTS FROM GAS STREAMS UTILIZING AN ACTIVATED FORM OF ALUMINUM

[76] Inventor: George G. Merkl, 46 Sunset Ct., Haworth, N.J. 07641

[*] Notice: The portion of the term of this patent subsequent to Mar. 15, 1994, has been disclaimed.

[21] Appl. No.: 768,573

[22] Filed: Feb. 14, 1977

Related U.S. Application Data

[63] Continuation of Ser. No. 346,772, Apr. 2, 1973, abandoned, which is a continuation-in-part of Ser. No. 86,364, Nov. 2, 1970, abandoned.

[51] Int. Cl.$^2$ ............................................. B01D 53/34
[52] U.S. Cl. .................................. 423/235; 423/241; 423/242
[58] Field of Search ............... 423/210, 242, 244, 235, 423/239, 240, 241, 567

[56] References Cited

U.S. PATENT DOCUMENTS 4,012,487  3/1977  Merkl ............................... 423/522 X

*Primary Examiner*—Earl C. Thomas
*Attorney, Agent, or Firm*—Arnold, White & Durkee

[57] ABSTRACT

Pollutants such as $NO_x$, $SO_x$, and/or halogen gases are removed from gas streams containing such pollutants by contacting and reacting the gas stream with an aqueous medium containing an activated form of aluminum, i.e., high purity aluminum which has been activated by permeation with a second metal selected from mercury, gallium, and indium/gallium alloys. After passing the gas stream rich in the pollutant through the aqueous medium, a gas stream is removed which is leaner in the pollutant.

12 Claims, No Drawings

METHOD OF REMOVING GASEOUS POLLUTANTS FROM GAS STREAMS UTILIZING AN ACTIVATED FORM OF ALUMINUM

CROSS-REFERENCE TO RELATED APPLICATION

This application is a continuation of application Ser. No. 346,772 filed Apr. 2, 1973, now abandoned which application is a continuation-in-part of Ser. No. 86,364 liled Nov. 2, 1970, now abandoned.

SUMMARY OF THE INVENTION

In accordance with the present invention, gaseous pollutants selected from $NO_x$ (NO and/or $NO_2$), $SO_x$ ($SO_2$ and/or $SO_3$), and/or halogens (chlorine, bromine, flourine and/or iodine) are removed from gaseous streams containing the same by passing the gaseous stream rich in the pollutant through an aqueous medium containing an activated form of aluminum. The activated form of aluminum comprises high purity aluminum metal, preferably aluminum metal of a purity of at least 99.9% by weight, which has been activated by permeation with a second metal selected from mercury, gallium and indium/gallium alloys. Preferably, the activated form of aluminum is in the form of rods or bars and the gas stream containing the pollutant is introduced into a suitable vessel containing the aqueous medium in such manner as to allow the gas to impinge upon the activated aluminum. This assures intimate contact between the pollutant within the gas stream and the activated aluminum. The gas stream which is withdrawn from the aqueous medium is leaner in the pollutant due to the reaction which occurs between the pollutant, activated aluminum and aqueous medium.

The process of the present invention for the removal of the pollutant from the gaseous stream can utilize any conventional gas-liquid contact apparatus, with the proviso that some suitable means is utilized to effect the desired intimate contact between the gas and activated aluminum. Typical apparatus suitable for this process is shown, for example, in applicant's parent application Ser. No. 346,772 filed Apr. 2, 1973 and entitled POLLUTION CONTROL.

DESCRIPTION OF PREFERRED EMBODIMENTS

The present invention involves the removal of a gaseous pollutant from a gas stream containing the pollutant by contacting the gas stream with an aqueous medium containing an activated form of aluminum. Accordingly, the essential components utilized in the process of the present invention involve the gas stream which is rich in the pollutant, the aqueous medium, and the activated form of aluminum. Each of these components will be individually discussed below.

Activated Aluminum

The key material in the process of the present invention is a first metal, e.g., aluminum metal, which has been activated through permeation by a second metal, i.e., a liquid metal selected from mercury, gallium and indium/gallium alloys. By "activated" is meant that the inter-crystalline structure of the aluminum is made uniquely and exceptionally receptive to chemical reaction. A more thorough description of the aluminum activation technique as well as an explanation of the physiochemical phenomena which occur during activation is contained in applicant's U.S. Pat. No. 3,993,595 issued Nov. 23, 1976, which is hereby incorporated by reference.

Basically, activation of the aluminum is carried out by wetting the surface of the aluminum in the presence of a source of hydrogen ions (protons), such as hydrochloric acid, with a liquid second metal selected from mercury, gallium and indium/gallium alloys until the aluminum has been permeated with the second metal. Evidence has been developed to establish that during this permeation of the aluminum the grain boundaries of the aluminum are actually penetrated by atoms of the second metal. This appears to create a realignment of the aluminum grain boundaries which has the effect of opening up the domains within the aluminum metal, resulting in unique reactivity properties.

The activated aluminum which is utilized in the process of the present invention shows many unique characteristics when compared with the base untreated aluminum metal. One of these is the dissolution of the aluminum and release of hydrogen ions or protons when placed in a liquid medium containing a source of hydrogen ions, e.g., water. It is this feature which is taken advantage of in the present invention and which allows for the effective removal of gaseous pollutants from gaseous streams with the activated aluminum.

In preparing the activated aluminum, aluminum metal in the form of relatively small rods or bars, preferably substantially free of bends and twists, is generally utilized. Preferably, solf aluminum metal having a purity of at least 99.9% by weight is used. The use of an aluminum metal with a substantial percentage of impurities is disadvantageous in the present invention in that activation requires substantially longer periods of time.

Using as an example the aluminum-mercury system, activation of the aluminum can be effectively carried out by floating an aluminum bar or rod on mercury in the presence of a hydrogen ion donating medium. This hydrogen ion donating medium can be an aqueous inorganic or organic acid, an aqueous alkaline solution or an alcohol, etc. In principle, any hydrogen ion source or hydrogen ion donating medium can be utilized. It is hypothesized that the mercury is caused to penetrate and diffuse through the aluminum in the form of a stable hydride formed in situ by the reaction between the mercury metal and hydrogen ions of the hydrogen ion donating medium. The ability of mercury, indium and gallium to act in a similar fashion appears to be associated with the hydride-forming capabilities of these metals and the fact that each of these metals has an atomic volume similar to that of hydrogen itself. This allows the metals to penetrate and diffuse through the aluminum either together with hydrogen or in the form of the hydride.

As will be apparent to those skilled in this art, the length of time required for activation of the aluminum with mercury will depend upon many factors, including the exposed surface area, which is related to the hardness of the aluminum, and the amount of impurities present in the aluminum. Longer times are required for harder aluminums and those with greater impurity contents. As a general rule, adequate activation of aluminum rods with mercury can be achieved in a time period of from about two hours to about twenty-four hours. When utilizing a preferred soft grade of aluminum, activation can be achieved in a period of from eight to twelve hours.

When the aluminum is activated, it becomes embrittled and can easily be broken, using a snapping action. By breaking the aluminum and examining the grain structure at the break, one can determine the degree to which the mercury has penetrated and diffused throughout the aluminum. In accordance with the preferred embodiment of the present invention, effective pollutant removal is achieved utilizing activated aluminum in which the mercury, gallium, or indium/gallium alloy has penetrated and diffused entirely throughout the aluminum structure.

In forming the activated aluminum, high temperatures should be avoided since high temperatures appear to prevent grain structure realignment due to lattice expansion. Generally, the activation of aluminum with mercury can be carried out under ambient temperature conditions, with a temperature in the range of from 40° to 100° F being preferred. When utilizing gallium as the second metal, it is often desirable to gently heat the gallium in order to maintain the gallium in the liquid state, thereby allowing the permeation to more effectively taken place. Here again, however, excessive temperatures should be avoided.

When forming the activated aluminum using gallium or an indium/gallium alloy, the permeation and diffusion of the gallium or indium/gallium through the aluminum rod may be initiated merely by contacting one end of the aluminum rod with the second metal or metals in the presence of the hydrogen ion donating medium. The initiation of diffusion may be observed by noting the surface wetting of the aluminum with the second metal or metals above the point of contact. Further diffusion of the gallium or indium/gallium alloy through the entirety of the aluminum can then be continued by placing the aluminum rod in an anhydrous organic liquid medium such as alcohol, or the like, which is capable of donating hydrogen ions for effecting further diffusion.

With respect to the indium/gallium alloys which may be used, essentially any alloy composition will be suitable, ranging from 90% by weight gallium and 10% by weight indium to 10% by weight gallium and 90% by weight indium. When employing such alloy, however, a 50:50 weight mixture of gallium and indium is extremely effective. As the percentage of indium is increased in the indium/gallium alloy, there is an increasing tendency for the activated aluminum to disintegrate, particularly when in an aqueous environment. This, however, does not prevent effective pollutant removal in accordance with the process of the present invention.

The amount of mercury, gallium or indium/gallium alloy which penetrates and diffuses through the aluminum will depend, of course, upon the length of treatment, temperature of treatment and the ability of the aluminum to retain the second metal or metals. As previously mentioned, it is preferred in accordance with the present invention to employ an activated aluminum in which the mercury, gallium or indium/gallium alloy has penetrated entirely through the aluminum. Aluminum which has been "totally" activated in this manner dissolves or erodes with the greatest efficiency under the process conditions of the present invention.

Generally, a soft aluminum will pick up and retain a maximum of about 5% by weight of mercury during the activation process, with typical pickups being in the 2.5 to 3.5% by weight range. This amount of mercury is very effective to achieve the desired results of the present invention. Even with much smaller amounts of mercury, however, e.g., amounts as low as 0.1%, the aluminum becomes activated and can be used to effectively remove gaseous pollutants from gas streams in accordance with the process of the present invention. It is preferred, however, to operate with a mercury content within the above specified range of about 2.5 to about 3.5% by weight.

It has generally been found that an aluminum activated with gallium or indium/gallium alloy is more active than the mercury-activated aluminum. For this reason, the amount of gallium or indium/gallium required to achieve suitable activation is less than the amount of mercury required. Generally, the aluminum will pick up and retain a maximum of about 3% by weight gallium or indium/gallium alloy. However, suitable activation can be achieved with as little as about 0.05 to about 1.0% by weight gallium or indium/gallium alloy and it is preferred to utilize an amount in this range. However, it has been found that even with amounts of these metals as low as 0.1% by weight, very active aluminum effective for the process of the present invention can be provided.

Gaseous Pollutant

The process of the present invention is effectively carried out to remove pollutants from gaseous streams, the pollutants being selected from $NO_x$, $SO_x$ and/or halogens. The particular source of the pollutant is not critical to the present invention, nor is the present invention effected by the concentration of the pollutant within the gaseous stream or the makeup of the gaseous stream in terms of components other than the above described pollutant. Typical examples of applicable gaseous streams containing the above pollutants include the stack or flue gas of a nitric acid plant, the stack or flue gas of a sulfuric acid plant, and the off-gas of various plastic manufacturing processes which contain halogens. Any or all of these gaseous streams can be effectively treated in accordance with the present invention in order to reduce the pollutant concentration therein. Thus, is accordance with the present invention, the gas stream rich in the above pollutant is introduced into the aqueous medium so as to impinge the activated form of aluminum, with the gas stream which is withdrawn being leaner in its pollutant content.

Aqueous Medium

The aqueous medium employed in accordance with the present invention is utilized as a reaction medium to effect the dissolution or erosion of the activated form of aluminum. Furthermore, as will be indicated later in connection with reaction parameters, it is believed that some reaction occurs between the water, dissolving aluminum ions of the activated aluminum and pollutant, i.e., $NO_x$, $SO_x$ and/or halogen. In accordance with the present invention, the aqueous medium can effectively be ordinary water or water which has been treated to remove extraneous minerals and salts.

Reaction Parameters

The dissolution of the activated aluminum in the aqueous medium provides aluminum ions for effective reaction with the pollutants within the gaseous stream so that the pollutant can be effectively removed. The conditions under which the activated aluminum dissolves in the aqueous medium are not at all severe and dissolution of the aluminum metal and accompanying atomic hydrogen release can be effectively carried out under ambient temperature and pressure conditions. Accordingly, the pollution removal of the present invention can be effectively carried out under ambient conditions of temperature and pressure, although it may be desirable under certain circumstances to vary the temperature and pressure conditions of this process. For example, with $SO_x$ and $NO_x$ it is preferred to carry out the pollution removal process at a temperature of about 140° to about 160° F. In addition, with halogen pollutants, temperatures at or near the boiling point of the aqueous medium are preferred. The temperature and pressure, however, are not in any way critical to the process of the present invention, and it is emphasized again that effective pollutant removal from the gaseous stream can be achieved under conditions of atmospheric pressure and ambient conditions of temperature, although effective pollutant removal can be achieved at any temperature between the freezing point of the aqueous medium and its boiling point.

The pollution removal process of the present invention is independent of the concentration of the pollutant within the gas stream and independent of the flow of the gas stream containing the pollutant and its ratio with respect to the activated aluminum. All that is necessary is that the activated aluminum be present in the aqueous medium and that the gas stream containing the pollutant be introduced into the aqueous medium in such manner as to create effective contact between the gas stream containing the pollutant and the dissolving activated aluminum. This can be easily achieved by impinging the gas stream directly in the vicinity of the activated aluminum, preferably in the form of bars or rods. Again, typical apparatus for achieving this contact is illustrated in applicant's parent application Ser. No. 346,772 filed on Apr. 2, 1973.

While the above co-pending application shows typical apparatus which can be used in the process of the present invention, it should be recognized again that any conventional gas-liquid contact apparatus which effectively can allow intimate contact between the gas stream containing the pollutant, and the activated aluminum within the liquid medium can be utilized to reduce the pollutant concentration in the gas stream in accordance with the present invention. Accordingly, the process of the present invention is not in any way limited by any particular type of contact apparatus.

As indicated above, it is hypothesized in accordance with the present invention that a reaction occurs between the aluminum ions dissolving in the aqueous medium, released atomic hydrogen, and the pollutant within the gas stream. Under certain conditions of reaction this reaction may produce a valuable by-product within the aqueous medium. However, the process of the present invention does not have as an objective the production of such by-product, and the process of the present invention is effectively carried out regardless of the nature of the reaction which occurs and regardless of the nature of the by-product which may or may not be produced within the aqueous medium. In this respect, all that is necessary to establish the effectiveness of the present invention is to note the higher concentration of the pollutant in the incoming gas stream than that gas stream which exists from the aqueous medium after contact with the activated aluminum. For this reason, no attempt is made here to speculate as to the nature of the chemical reactions which may occur in the aqueous medium or to speculate as to the nature of the by-products which may be formed in the aqueous medium based upon the specific process parameters which are utilized.

The present invention will now be described by reference to the following specific examples. It must be understood however that such examples are presented for purposes of illustration only, and the present invention can not under any circumstances be deemed limited thereto. In addition, unless specified otherwise, all percentages set forth in the following examples are by weight.

EXAMPLES

Example 1

In order to demonstrate the capability of the present invention to remove nitrogen dioxide from a gas containing the same, nitrogen dioxide was prepared and then introduced into a device, similar to that shown in FIG. 2 of applicant's parent application Ser. No. 346,772 filed Apr. 2, 1973.

The nitrogen dioxide was produced by introducing 150 mg of copper into an excess of nitric acid. Approximately 75 mg of nitrogen dioxide were generated by the reaction.

The device for treating the nitrogen dioxide included a bed of activated aluminum prepared from aluminum having a purity of 99.98% which had been permeated by mercury in the presence of hydrogen ions. The reaction medium was water.

The experiment was operated in a closed system and it was found that approximately 27 mg of $NH_3$ were formed, thus demonstrating that nitrogen dioxide was removed to a significant extent by this process.

Example 2

The procedure of Example 1 was repeated for aluminum having a purity of 99.9% and permeated with 0.5% by weight of gallium. Similarly successful results were obtained.

Example 3

A process for the removal of sulfur dioxide from a polluted gas containing sulfur dioxide was run using a device similar to that used in Example 1. In this case, activated aluminum was prepared from aluminum, 99.9% by weight pure, and permeated with about 0.5% by weight gallium.

Some 350 g of sulfur dioxide were introduced into the device and it was found that 178 g of free sulfur were collected by skimming the surface of the water used. Further sulfur was present in the viscous transparent liquid (possibly as a complex with the aluminum), as was shown by the fact that heating the viscous liquid at about 180° F resulted in the release of free sulfur.

Example 4

Example 3 was repeated except that an apparatus similar to that shown in FIG. 1 of applicant's parent application Ser. No. 346,772 filed Apr. 2, 1973 was used. Water was sprayed over the activated aluminum while the sulfur dioxide was brought into contact with the activated aluminum. The results obtained were comparable to those obtained in Example 3.

Example 5

A device similar to that used in Example 1 was employed with activated aluminum and water with the following halogen gases to simulate pollutants: chlorine, bromine, fluorine, and iodine. In each case, the pollutant halogen was dissolved in the water, possibly as a complex with the aluminum, thus indicating that the process is applicable to the treatment of halogen-containing gases.

While the present invention has been described primarily with regard to specific embodiments and the foregoing exemplification, it should be understood that the present invention can not be strictly construed to embrace only such embodiments illustrated. For example, as indicated above, it is possible in accordance with the present invention to treat a gas stream containing a plurality of pollutants, such as described herein. Moreover, while specific apparatus has been illustrated in the examples, it should again be quite apparent that any gas-liquid contact apparatus which effectively allows contact between the gas stream containing the pollutant and the activated form of aluminum within the aqueous medium can be advantageously employed. Still further, it should be recognized that the process of the present invention achieves a reduction in the pollutant content of the gas stream regardless of the nature of the by-product which is formed in the aqueous medium, and as a result, the process of the present invention is not based upon the nature or extent of any particular by-product formed. Accordingly, all of this must be taken into consideration in determining the scope of the present invention as defined in the claims appended hereto.

What is claimed is:

1. A process of removing $SO_2$ from a gaseous stream containing $SO_2$, which comprises:
    contacting said gaseous stream, in an aqueous medium, with a bed of reactive aluminum comprising:
    (a) aluminum metal of a purity of at least about 99.9% by weight permeated with
    (b) an effective activating amount of a liquid metal selected from mercury, gallium and indium/gallium alloys.

2. The process of claim 1 wherein said liquid metal (b) is mercury and said mercury is permeated through said aluminum in an amount of 0.1 to 5.0% by weight.

3. The process of claim 2 wherein said mercury is permeated through said aluminum in an amount of 2.5 to 3.5% by weight.

4. The process of claim 1 wherein said liquid metal (b) is gallium or an indium/gallium alloy, and said liquid metal (b) is permeated through said aluminum in an amount of 0.01 to 3.0% by weight.

5. A process of removing pollutants selected from NO and $NO_2$ from a gaseous stream containing the same, which comprises:
    contacting said gaseous stream, in an aqueous medium, with a bed of reactive aluminum comprising:
    (a) aluminum metal of a purity of at least 99.9% by weight permeated with
    (b) an effective activating amount of a liquid metal selected from mercury, gallium and indium/gallium alloys.

6. The process of claim 5 wherein said liquid metal (b) is mercury and said mercury is permeated through said aluminum in an amount of 0.1 to 5% by weight.

7. The process of claim 6 wherein said mercury is permeated through said aluminum in an amount of 2.5 to 3.5% by weight.

8. The process of claim 5 wherein said liquid metal (b) is gallium or an indium/gallium alloy and said liquid metal (b) is permeated through said aluminum in an amount of 0.01 to 3.0% by weight.

9. A process of removing a halogen pollutant selected from chlorine, bromine, fluorine and iodine from a gaseous stream containing the same, which comprises:
    contacting said gaseous stream, in an aqueous medium, with a bed of reactive aluminum comprising:
    (a) aluminum metal of a purity of at least about 99.9% by weight permeated with
    (b) an effective activating amount of a liquid metal selected from mercury, gallium and indium/gallium alloys.

10. The process of claim 9 wherein said liquid metal (b) is mercury and said mercury is permeated through said aluminum in an amount of 0.1 to 5% by weight.

11. The process of claim 10 wherein said mercury is permeated through said aluminum in an amount of 2.5 to 3.5% by weight.

12. The process of claim 9 wherein said liquid (b) is gallium or an indium/gallium alloy and said liquid metal (b) is permeated through said aluminum in an amount of 0.01 to 3.0% by weight.

* * * * *